INVENTORS
ROBERT E. WISEBAKER
GERALD R. EAKIN
BY RICHEY, McNENNY & FARRINGTON
ATTORNEYS

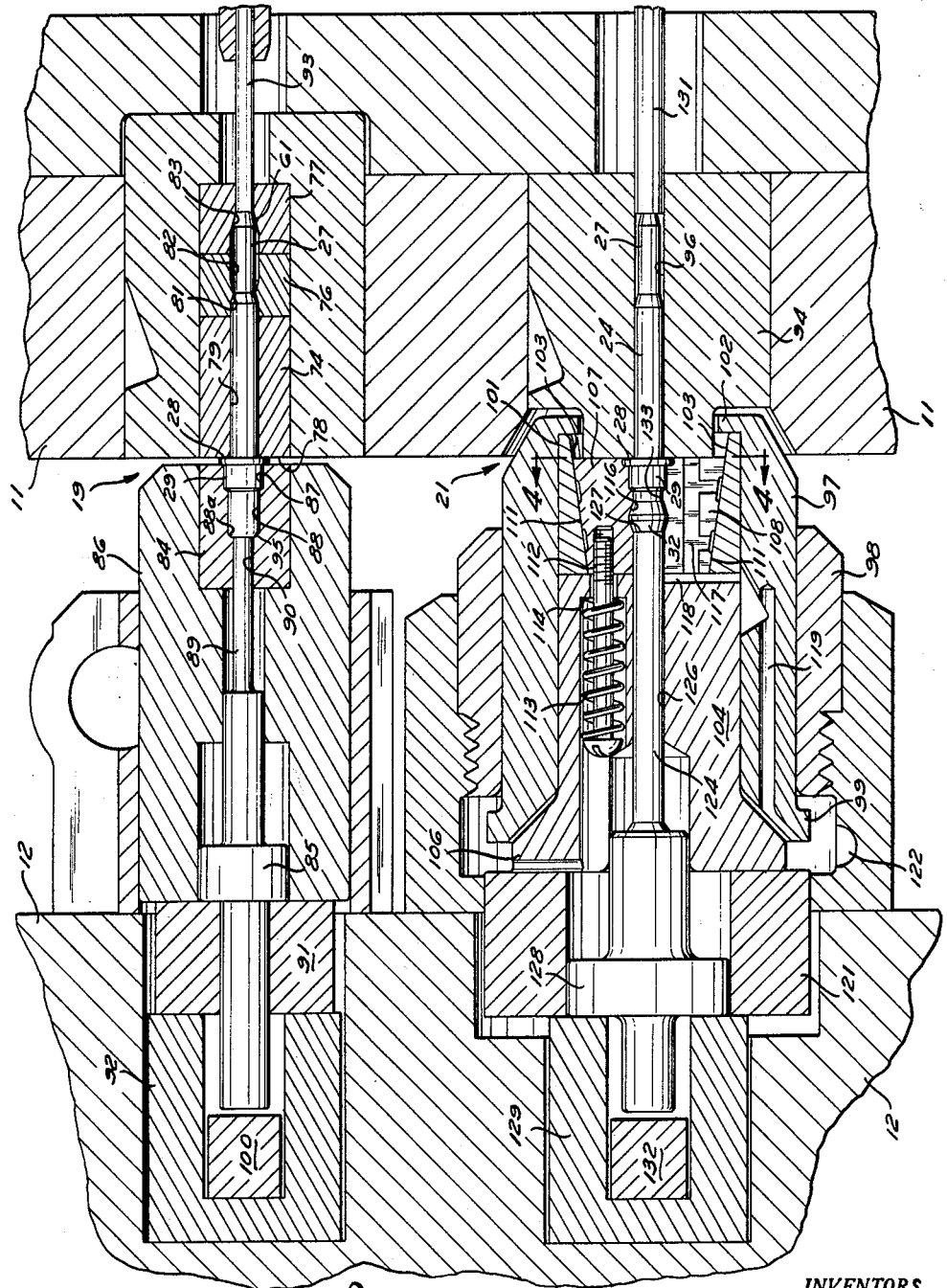

June 15, 1965  R. E. WISEBAKER ETAL  3,188,849
METHOD AND APPARATUS FOR MULTIPLE UPSETTING
Filed Sept. 12, 1961  4 Sheets-Sheet 3
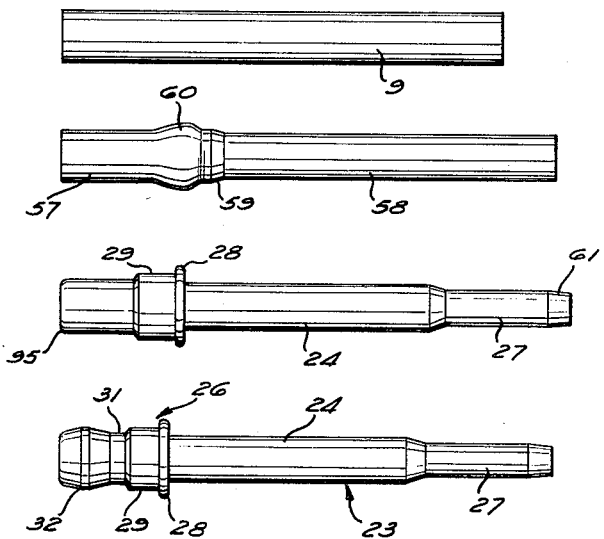
Fig. 7
Fig. 8
Fig. 9
Fig. 10
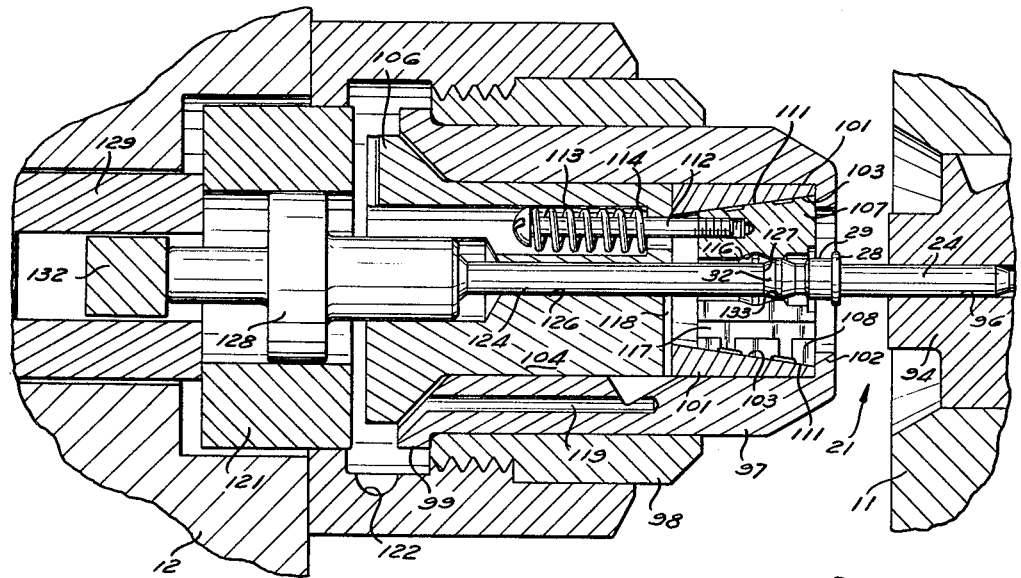
Fig. 3
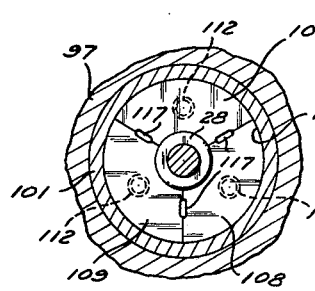
Fig. 4
INVENTORS
ROBERT E. WISEBAKER,
GERALD R. EAKIN
BY
RICHEY, McNENNY & FARRINGTON
ATTORNEYS June 15, 1965  R. E. WISEBAKER ETAL  3,188,849
METHOD AND APPARATUS FOR MULTIPLE UPSETTING
Filed Sept. 12, 1961  4 Sheets-Sheet 4
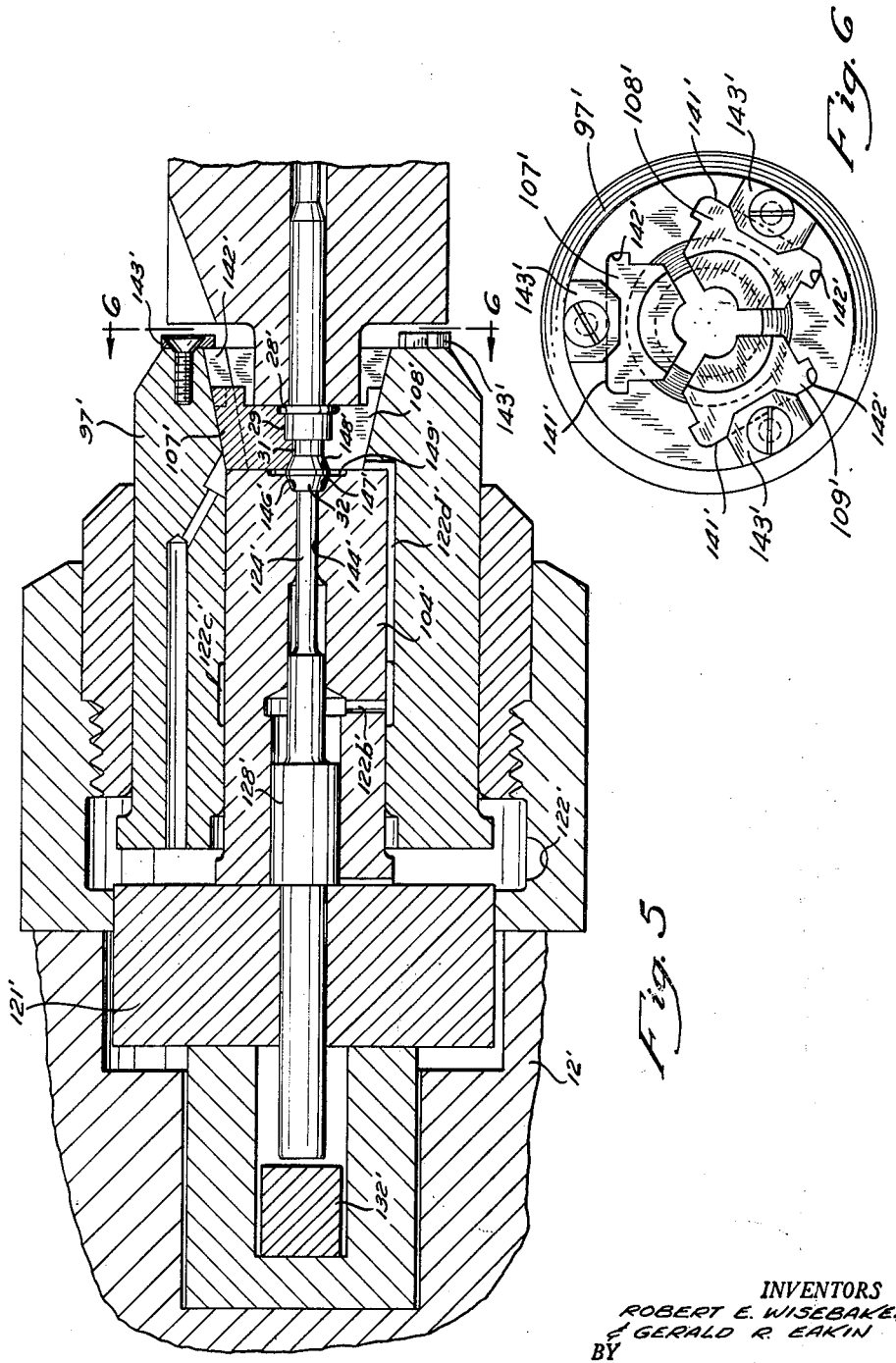
INVENTORS
ROBERT E. WISEBAKER,
& GERALD R. EAKIN
BY
RICHEY, McNENNY & FARRINGTON
ATTORNEYS United States Patent Office 3,188,849
Patented June 15, 1965

3,188,849
METHOD AND APPARATUS FOR MULTIPLE UPSETTING
Robert E. Wisebaker and Gerald R. Eakin, Tiffin, Ohio, assignors to The National Machinery Co., Tiffin, Ohio, a corporation of Ohio
Filed Sept. 12, 1961, Ser. No. 137,699
11 Claims. (Cl. 72—346)

This invention relates to a method and apparatus for cold forming articles with multiple upsets such as spark plug studs and the like.

In the manufacture of articles having two spaced enlarged sections such as spark plug studs, the prior art commercial practice has been to start with a solid cross-sectional workpiece or blank which has a length and cross-sectional size at least as large as the corresponding dimensions of the finished stud. By suitable machining operations, the material of the blank has been removed to produce the finished article of the necessary configuration. This method of manufacture involves a great waste of material and is expensive since even automatic screw machines have limited output.

In a method and apparatus incorporating this invention a progressive header is used to form the finished spark plug stud without any waste of material. Because of the high speed operation of such machines, a single machine is capable of producing quantities of studs far in excess of the quantities possible with even the most efficient high speed screw machine. Because the stud is formed cold, the surface finishes and dimensional tolerances are maintained so that high quality studs are produced which meet all of the specification requirements of such articles.

It is an important object of this invention to provide a novel and improved method of manufacturing headed articles such as spark plug studs by means of cold forging operations.

It is another important object of this invention to provide a novel and improved process for forming articles within a progressive header wherein the articles have two spaced upset portions connected by an intermediate section of reduced cross-section.

It is another important object of this invention to provide a novel and improved apparatus for cold forging spark plug studs on a progressive header.

It is another important object of this invention to provide a novel and improved tool assembly for use on progressive headers which permits the manufacture of articles having two upset sections connected by a reduced diameter portion.

It is another important object of this invention to provide a novel and improved tool assembly for use on a progressive header comprising die elements expandable from a closed condition wherein they define a die cavity in which an article is upset to an open position for removal of the upset article from the tool assembly.

It is still another object of this invention to provide a novel and improved die assembly having means to securely lock die segments in a closed position during an upsetting operation and thereafter permit opening of the die segments to allow the removal of a blank formed therein.

It is another important object of this invention to provide a novel and improved process for cold forging articles having multiple extrusion sections and multiple upset sections within an automatic progressive header.

It is another important object of this invention to provide a novel and improved tool assembly adapted to be mounted on the slide of a cold header arranged to permit the upsetting of a portion of a blank completely within a die cavity formed by such tool assembly.

Further objects and advantages will appear from the following description and drawings wherein:

FIG. 2 is an enlarged fragmentary section of the second and third work forming stations wherein the upsetting operations are performed illustrating the structural detail of the dies and tools;

FIG. 3 is a fragmentary view of the third work forming station illustrating the operation of the mechanism during the removal of the finished blank from the dies and tools;

FIG. 4 is a fragmentary section taken along 4—4 of FIG. 2;

FIG. 5 is a longitudinal section of a work station of a second embodiment which can be substituted for the third work forming station illustrated in FIG. 2;

FIG. 6 is a fragmentary section along 6—6 of FIG. 5 illustrating the die segments in the opened position;

FIG. 7 is a side elevation of the initial blank cut from wire stock;

FIG. 8 is a side elevation of the blank formed in the first blank working station;

FIG. 9 is a side elevation of the blank formed in the second blank working station; and FIG. 10 is a side elevation of the final blank completed in the third and final blank working station.

Figure 1:
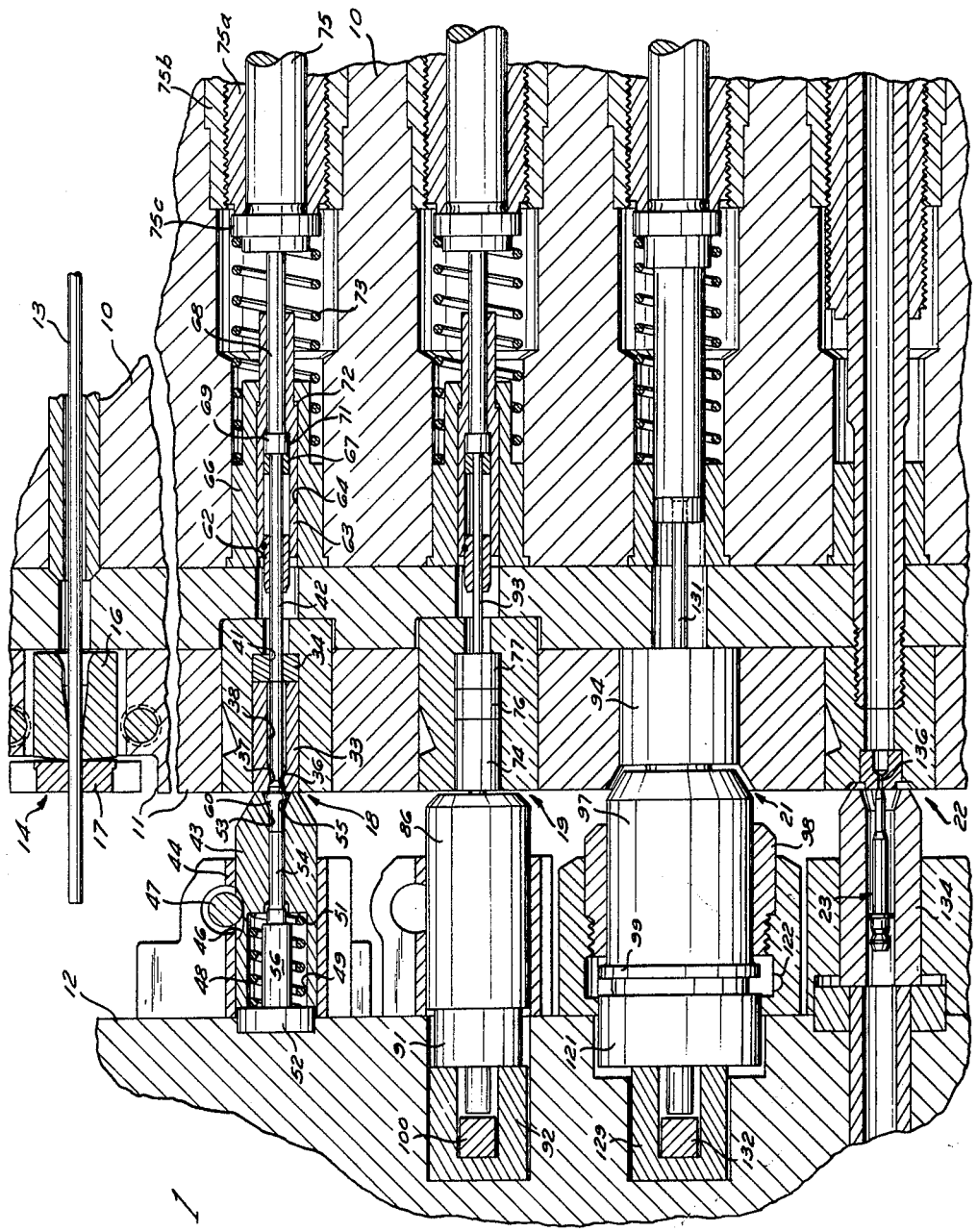
FIG. 1 is a plan view of work stations of a progressive header incorporating this invention illustrating the operational steps and structure for forming a spark plug stud.

Progressive headers of the type suitable for use with this invention include a frame provided with a die breast having a plurality of work stations, a slide reciprocable toward and away from the die breast by a crank mechanism and transfer means for progressively positioning a blank at each work station. Cooperating dies and tools mounted on the slide and breast progressively work the blank to form the finished article.

Referring to FIG. 1, for purposes of illustration the parts of a progressive header not necessary for a clear understanding of this invention are not shown and only those portions of the progressive header critical to this invention are illustrated. A frame 10 is provided with a die breast 11 positioned in alignment with the reciprocating movement of a header slide 12. Wire or rod stock 13 is fed through the frame 10 by any conventional type of feed rollers or the like and is sheared at the shearing station 14 into accurately measured blanks 9 illustrated in FIG. 7. The shearing station 14 includes a hardened bushing 16 and a vertically reciprocable knife 17 which shears off the blank and carries it up into horizontal alignment with the blank working stations wherein it is gripped by a first pair of transfer fingers or scissors and carried to the first blank working station 18.

The transfer mechanism and the shearing mechanism are not shown, however the United States patent to Clouse, 2,026,823, dated January 7, 1936 and the United States patent to Friedman, 2,721,434, dated October 25, 1955, disclose suitable transfer and shearing mechanisms, respectively. Other suitable shearing and transfer mechanisms can be used if they properly function to shear blanks from the wire stock 13 and progressively move such blanks to each blank working station 18, 19, and 21 and on to a blank receiving station 22 through which the finished blanks pass out of the machine. It should be understood that on each stroke of the progressive header, a blank is worked at each of the blank working stations so that a completed article is formed during each cycle of the header slide 12.

The finished article or spark plug stud blank 23 is illustrated in FIG. 10. The stud 23 includes a shank having a first extruded portion 24 extending from a head section 26 and a second extruded shank portion 27 having a diameter smaller than the diameter of the first portion 24. The head section includes an upset flange 28 adjacent the first shank portion 24, a cylindrical head 29 joined to a reduced diameter cylindrical portion 31 and a second upset end 32 having a diameter larger than the diameter of the cylindrical portion 31. The head assembly 26 therefore includes two upset portions joined by an intermediate reduced diameter portion 31.

In the past articles of this type have not been formed on high speed progressive headers since the two spaced header sections could not be removed from the dies. In an apparatus incorporating this invention, however, such articles are easily formed on high speed progressive headers thereby achieving the advantages of scrap elimination, low cost, high speed operations, and good surface finishes with accurately controlled dimensions.

Referring again to FIG. 1, two die elements 33 and 34 are mounted in the die breast 11 at the first blank working station 18. The first die element 33 is formed with a guiding section 36 having a diameter equal to the diameter of the blank 9 and an extrusion throat 37 followed by an enlarged relief bore 38. The second die element 34 is formed with a bore 41 having a diameter equal to the throat 37 to guide a knockout pin 42.

The tools mounted on the header slide 12 at the first blank working station 18 include a sleeve 43 mounted for limited axial movement within a tool holder 44. The sleeve is formed with an axial keyway 46 in which a cylindrical key 47 is positioned. A spring 48 located in an enlarged bore 49 extends between a shoulder 51 on the sleeve 43 and a back-up plate 52 and serves to resiliently bias the sleeve 43 forward relative to the header slide 12 to a position wherein the key 47 engages the rearward end of the keyway 46.

When the header slide 12 approaches the forward position of FIG. 1, the forward end of the sleeve 43 engages the first die element 33 to limit forward movement of the sleeve during the last portion of the forward stroke. When this occurs, the sleeve 43 remains stationary relative to the die breast 11 as the header slide continues to move to the extreme forward position illustrated. The sleeve 43 is formed with a central bore 53 having a diameter equal to the diameter of the blank 9 and a conical mouth 55 so that material is upset and gathered at 60 for the flange 28 and head 29 formed in the next die station. A pin 54 closely fits the bore 53 and is formed with a projection 56 engaging the back-up plate 52 to limit rearward movement thereof.

As the header slide 12 moves forward, the cylindrical blank 9 from the shearing station 14 is engaged by the tools and dies of the first blank working station 18. The forward end of the blank moves into the guide portion 36 and the rearward end into the central bore 53. The engagement of the pin 54 with the left end of the blank forces the right end of the blank through the extrusion throat 37, thus reducing the diameter of a portion of the blank. This continues until the end engages the pin 42 preventing further extrusion. During the last portion of the stroke of the slide 12, the sleeve 43 engages the die 33 and the upset at 60 is performed by the continued movement of the pin 54.

The blank formed at the first die working station 18 is illustrated in FIG. 8. The left end or unextruded portion 57 retains substantially the original diameter and extends to the upset 60. The extruded portion 58 has a reduced diameter and a conical section 59 formed by the extrusion throat 37.

As the header slide moves back away from the die breast 11, the knockout pin 42 is operated to eject the blank from the dies at the first station. The center of the knockout pin 42 is supported by a sliding guide bearing 62 mounted in a sleeve 63 which is in turn mounted for sliding movement within a bore 64 formed in a guide 66 on the frame 10. The right end of the knockout pin 42 is provided with a second guide bearing 67 slidable within the sleeve 63. A pin 68 engages the right end of the knockout pin 42 and is formed with a head 69 engageable with a shoulder 71 on the sleeve 63 so that the pin 68 does not move relative to the sleeve 63 in a rightward direction beyond the position illustrated. Cooperating shoulders at 72 formed on the sleeve 63 and the guide 66 prevent movement of the sleeve 63 relative to the guide 66 in the rightward direction beyond a predetermined position substantially as shown. The right end of the pin 68 engages an operator 75 which is moved to the left by a power drive (not shown) in timed relationship to the operation of the header slide 12. A spring 73 normally maintains the operator in the rightward position illustrated in FIG. 1.

A suitable power drive for the operator 75 is disclosed in the U.S. patent to Clouse No. 2,038,543 dated April 28, 1936. The operator 75 extends through an adjustment sleeve 75a threaded into a bushing 75b mounted on the frame 10. The sleeve 75a engages a shoulder 75c adjustably locating the maximum rearward position of the pin 42 and in turn the length of the extruded portion 58.

Since the pin 42 cannot have a diameter larger than the end of the blank and must be long enough to eject the blank from the dies 33 and 34, the bearing 62 is required to prevent buckling or breakage of the knockout pin 42. Since the forward end of the knockout pin 42 is supported by the bore 41, the rearward end is supported by the guide 67 and the mid-portion of the knockout pin is supported by the guide 62, and knockout pin is only unsupported for a maximum distance equal to approximately half of the length of stroke of the knockout pin 42. As the header slide 12 moves away from the die breast, the operator 75 is moved to the left pushing the knockout pin 42 to the left resulting in the ejection of the blank from the dies of this station. When this occurs, two possible modes of operation occur, either of which are proper.

If the frictional resistance to movement of the sleeve 63 exceeds the frictional resistance to movement of the pin 42 relative to the sleeve 63, the sleeve 63 remains stationary and the pin 42 moves relative thereto during the first portion of the ejection operation. When the second guide bearing 67 engages the first guide bearing 62, the continued movement of the operator 75 causes the sleeve 63 to move to the left during the remaining portion of the ejection operation. At no time during the operation is the unsupported length of the knockout pin 42 greater than the spacing between the guide bearing 62 and the inner end of the die element 34. The other mode of operation occurs if the friction resisting relative movement between the knockout pin 42 and the sleeve 63 exceeds the frictional resistance to movement of the sleeve 63. The first portion of the ejection operation will result in movement of the sleeve with the pin 68 until the end of the first guide bearing 62 engages the end of the die element 34. Continued movement of the operator 75 then causes the knockout pin 42 to move relative to the sleeve 63. With this mode of operation, the maximum unsupported length of the knockout pin 42 is equal to the spacing between the two guide bearings 62 and 67. It is apparent, therefore, that the above described structure provides the necessary support to prevent breakage or buckling of the knockout pin 42 even though the pin must be relatively long and thin. Springs are not required to return the knockout pin 42 to the position of FIG. 1 since the engagement of the pin with the end of the blank during the extruding operation will perform this function.

The blank completed at the first die working station 18 is transferred to the second die working station 19 illustrated in detail in FIG. 2. At this die station the blank illustrated in FIG. 9 is formed. This blank includes the upset flange 28, and the cylindrical head 29, the second shank portion 27, and the conical pointed end 61.

The die assembly at the second blank working station 19 includes three die elements 74, 76 and 77. The first die element 74 is formed with an end face 78 and a uniform diameter central bore 79 having a diameter substantially equal to the diameter of the extruded portion 58 formd at the first die working station 18. The second die element 76 is formed with an extrusion throat 81 followed by a clearance bore 82 and the third die element is formed with a pointing conical die opening 83.

The tool assembly mounted on the header slide 12 at the second die working station 19 includes an upsetting tool 84 mounted in a tool holder 86. The tool 84 is formed with a first bore 87 having a diameter larger than the diameter of the original stock, a second bore 88 having a diameter substantially equal to the diameter of the original stock, a reduced diameter bore 90 at the rearward end and a radius 88a between the two bores 88 and 90. A pin 89 mounted in the tool holder 86 extends through the bore 90 and is sized so that its end face is aligned with the inner end of the radius 88a.

The rearward end of the tool holder 86 and a shoulder 85 on the pin 89 engage a ring 91 which is in turn seated against a block 92 in the header slide 12. The ring 91 and block 92 operate to prevent leftward movement of the upsetting tool 84 and pin 89 relative to the slide 12 so forward movement of the header slide 12 to its forward extreme position moves these two elements to the position shown in FIG. 2.

During the forward movement of the header slide 12, the blank is forced to the right through the extrusion throat 81 by the engagement of the left end of the blank with the radius 88a and pin 89. This extrudes the second shank portion 27 of the final article and rounds the end at 95. The right end of the blank is also coned by the conical die opening to form the tapered end 61. When the blank engages the end of a knockout pin 93, further rightward movement of the blank is prevented and upsetting occurs, thus forming the flange 28 and the cylindrical head 29 intermediate the ends of the blank. The various elements are proportioned so that the forward face of the upsetting die 84 is spaced from the end face 78 of the first die element 74 when the header slide reaches its forward position and this spacing is equal to the thickness of the flange 28.

After the completion of the upsetting stroke at the second die working station 19, the header slide 12 retracts and the knockout pin 93 in cooperation with the pin 89 ejects the blank from the dies at this station. Because the knockout pin 93 must be long and slender for the same reasons discussed above relative to the knockout pin 42, a guide and operator assembly substantially identical to the guide assembly located at the first blank working station 18 is used to support the knockout pin 93.

The pin 89 is engaged by a knockout lever 100 which is operated by a drive (not shown) to cause the pin 89 to move forward relative to the upsetting die 84 as the header slide retracts to eject the blank from the upsetting die. The U.S. patent to Friedman No. 2,680,860 dated June 15, 1954 illustrates power drives for knockout levers in a header slide which are suitable for operating the knockout lever 100. The operation of ejection is controlled so that the blank completed at the second die working station 19 is properly positioned to be grasped by the transfer mechanism as the header slide moves away from the die breast 11.

At the third and final blank working station, illustrated in detail in FIGS. 2 and 3, the completed article is formed. At this station only one portion of the blank is worked, namely the upset end 32. A single holding die element 94 is mounted in the die breast 11 at the third blank working station 21. Die element 94 includes a through bore 96 having a diameter substantially equal to the diameter of the first portion of the shank 24. As the header slide 12 moves forward, the entire shank section of the blank moves into the bore 96 and all of the blank working occurs in the tool assembly carried by the header slide 12.

The tool assembly includes a ring 97 axially movable within a mounting sleeve 98 which is in turn mounted on the header slide 12. The ring 97 is formed with a flange 99 engageable with the inner end of the mounting sleeve 98 to limit rightward movement of the ring relative to the sleeve. A wedging ring 101 is mounted within the ring 97 against an inturned flange 102 and is formed with a conical inner surface 103. Positioned behind the wedge ring 101 and within the ring 97 is a sleeve 104 formed with an enlarged head 106 at its rearward end.

Three mating die elements or segments 107, 108 and 109 cooperate to define an upsetting die cavity when the die segments are in the closed position and are opened to permit removal of the upset blank from the cavity. The die segments are formed with conical outer surfaces 111 which bear against the internal conical surface 103 in the wedge ring. A bolt 112 is threaded into each die segment 107 through 109 and a spring 113 extends between the head of each of the bolts 112 and a shoulder 114 on the sleeve 104 and operates to resiliently urge each of the die segments to the left to the closed position illustrated in FIG. 2.

When the die segments 107 through 109 are in the closed position, they cooperate to form a die cavity 116 in which the second portion of the blank is upset. The forward ends of the die segments are proportioned to closely fit over the flange 28 and cylindrical head section 29 to prevent further upsetting of this portion of the blank.

A ring 121 is positioned to engage the head 106 and limit rearward movement of the ring 97. Air under pressure is supplied through a port 122 to the rearward end of the ring 97 to resiliently urge the sleeve 104 and the ring 97 forward to a position in which the flange 99 engages the rearward end of the sleeve 98 when the header slide 12 is spaced from the breast 11. The die segments are formed with venting passages 117 which communicate with radial slots 118 formed in the forward face of the sleeve 104. These slots in turn communicate with venting passages 119 in the ring 97. This provides a limited bleed of the compressed air and prevents the entrapment of cooling and lubricating oils which might interfere with the proper seating of the die segments.

An upsetting tool 124 extends into a central bore 126 formed in the sleeve 104 and is provided with a forward end face 127 which engages and upsets the blank in the die cavity 116 as the header slide 12 moves toward the forward extreme position. The upsetting tool 124 is formed with a head 128 which is engaged on its rearward face by a U-shaped block 129 to provide the upsetting force required. The ring 121 also engages the block 129. The block 129 is in turn seated against the header slide 12 at its rearward end.

In operation the blank is pushed into the bore 96 until the flange 28 engages the forward face of the die element 94 and the end is adjacent to or in engagement with the knockout 131. The springs 113 maintain the die segments 107 through 109 in their closed position as the header slide 12 moves forward. The compressed air maintains the ring 97 in its forward extreme position so that the forward face of the die segments engage the face of the die element 94 and confine the end of the blank before the slide 12 reaches its full forward position. The ring 97, sleeve 104 and die segments then remain stationary, due to the engagement of the die segments with the face of the die element 94 as the header slide approaches the extreme forward position and upsets the blank. During this phase of operation, the upsetting tool 124 engages the end of the blank and upsets it to the shape of the die cavity 116 thus completing the formation of the required spark plug stud. The radial pressure of upsetting on the die elements 107 through 109 cannot cause the die elements to open during the upsetting operation since the conical surface is not steep enough to result in leftward movement of the ring 101 due to the radial force of upsetting. The angle of the conical surface 103 should however be greater than a locking angle since the die elements 107 through 109 must move to the opened position.

As the header slide 12 moves back away from the die breast 11 after the upsetting operation, the blank is pulled to the left to a predetermined position illustrated in FIG. 3. A cam operated knockout lever 132 similar to the lever 100 then engages the rearward end of the upsetting tool 124 and prevents further movement of the upsetting tool 124 with the header slide 12. This operates to stop leftward movement of the blank at the position of FIG. 3. Since the die segments have a reduced diameter portion at 133, the die segments cannot freely pass over the upset end 32 until they have moved to their open position. Therefore, the die segments are retained by the blank as the header slide carries the wedging ring leftward away from the die breast until the position of FIG. 3 is reached. The conical surface 103 then allows radial displacement of the die segments to clear the upset end 32. As soon as the reduced diameter portion 133 passes over the upset end 32, the springs 113 snap the die segments back to the closed and seated position. Since the shank is positioned in a solid die during the operation at the work station 21, the shank is smooth and does not have longitudinal irregularities from the junction of two or more expandable dies.

As the header slide continues to retract away from the die breast 11, the knockout pin 131 ejects the blank out of the die element into the transfer mechanism which moves the completed blank to the blank receiving station 22 illustrated in FIG. 1. A receiving tube 134 is located at the blank receiving station 22 on the header slide 12 so the following forward stroke of the header slide causes the finished blank to be positioned within the bore of the receiving tube 134. A compressed air nozzle 136 is mounted in the die breast 11 to blow the finished blank up the receiving tube 134 into a passage 136 through which the blank is carried back to a track leading to a thread roller where the shank section 27 has a series of rings rolled on and the head section 32 is rolled lightly.

In FIGS. 5 and 6 a modified structure is illustrated which can be substituted for the third blank working station 21. In this embodiment the upset end 32 is again formed within a die assembly mounted on the header slide 12 but only a portion of the die cavity is formed by the die segments. Similar numerals will be used to describe elements which correspond to the elements of the first embodiment but a prime (') will be added to indicate that reference is made to the second embodiment of FIGS. 5 and 6.

The die segments 107', 108' and 109' are formed with opposed flanges 141' best illustrated in FIG. 6. A mating T-shaped groove 142' is formed in the ring 97' to receive each segment. The T-shaped grooves 142' are inclined inward as they extend back from the face of the ring 97', therefore, movement of the die elements 107' through 109' to the left along the grooves causes the elements to move radially toward each other to the closed position. Conversely, movement of the elements to the right end of the groove causes the die elements to open for removal of the blank after the upsetting operation. A stop plate 143' is bolted to the ring 97' at the ends of each of the grooves 142' after the die segments are inserted and is proportioned to extend radially into alignment with the ends of the die segments to retain the die elements in the grooves 142'.

In this embodiment the upsetting operation is produced by cooperation between the upsetting tool 124' and the sleeve 104'. The sleeve is formed with a bore 144' in which the upsetting tool 124' is located. The forward end of the sleeve 104' is formed with a radial shoulder 146' and a flaring conical section 147'. As the slide approaches the die, the tool 124' is held forward by the compressed air admitted through the port 122'. Therefore, the tool 124' engages the end of the blank and pushes it into the die 94' before the die segments are closed around the blank. A vent 122b', annular groove 122c', and axial groove 122d' prevent back pressure from building up to interfere with this operation. During the upsetting operation, the forward face of the upsetting tool 124' is positioned in alignment with the shoulder 146' by the engagement of both the left hand end of the sleeve 104' and the head 128' with the ring 121'. In this embodiment the compressed air supplied through the port 122' again urges the sleeve 97' forward to its maximum extended position. As the header slide 12' moves forward, the die segments 107' through 109' engage the end face of the element 94' so that they are automatically pushed down along their respective T-shaped grooves 142' to the closed position illustrated in FIG. 5. This occurs before the header slide 12' reaches the end of its forward stroke.

The die segments are formed with inner faces which closely fit the flange 28 and the cylindrical head 29 as well as the reduced diameter cylindrical portion 31. The inner end of each of the die segments is formed with a flaring opening 148' which conforms to the shape of one side of the upset end 32 of the finished blank and cooperates with the conical section 147' to define the die cavity for the upset end 32. A clearance groove 149' is formed in the forward face of the sleeve 104', however, the mass of material upset and the proportions of the sleeve and die elements are arranged so that flash does not extend into this clearance.

The die segments 107' through 109' are closed around the end of the blank before the upsetting occurs and remains stationary relative to the blank during the upset operation. It should be noted, however, that the die segments do not define the entire die cavity and that the blank is upset both in the end of the sleeve 104' and the flared opening 148' of the die segments. The line of separation between the end of the sleeve 104' and the die segments 107' through 109' is located at the point of maximum diameter of the upset end 32.

The manner of blank removal from the dies at this work station is substantially the same as that described in connection with the first embodiment. During the initial portion of the movement of the header slide away from the die breast the blank remains fixed relative to the die elements and the sleeve 104'. At a predetermined position in the rearward stroke of the header slide the knockout lever 132' engages the rearward end of the upsetting tool 124' and prevents further movement of the blank with the header slide. This causes the die elements 107' through 109' to move along their T-shaped grooves 142' until they each engage their respective stop plates 143'. When this occurs, the die segments have moved radially apart a sufficient distance to permit the blank to clear the inner surface of the die segments.

By providing an apparatus according to either of the embodiments of this invention, it is possible to economically manufacture articles such as spark plug studs or other similar articles within a high speed progressive header. Substantial improvement in economy are realized by such manufacturing procedures since all scrap is eliminated and the unit production costs are greatly decreased.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. In a machine of the character described a frame, a solid die mounted on said frame operable to position a blank with an end protruding therefrom, a slide reciprocable forward and rearward from said solid die, and a tool assembly carried by said slide operable to upset said protruded end, said tool assembly including a carrier, die elements on said carrier, cams on said carrier and die elements operable to move said elements between expanded and closed positions, said die elements cooperating to define a die cavity when closed, said carrier closing said die elements around said protruding end after a blank is positioned in said solid die in response to movement of said slide toward said solid die before said slide reaches its forwardmost position, and an upsetting tool on said slide upsetting the protruding end in said cavity when said slide reaches its forwardmost position.

2. In a machine of the character described a frame, a solid die mounted on said frame operable to position a blank with an end protruding therefrom, a slide reciprocable forward and rearward from said solid die, and a tool assembly carried by said slide operable to upset said protruded end, said tool assembly including a carrier, die elements on said carrier, cams on said carrier and die elements operable to move said elements between expanded and closed positions, said die elements cooperating to define a die cavity when closed, said carrier closing said die elements around said protruding end after a blank is positioned in said solid die in response to movement of said slide toward said solid die, an upsetting tool on said slide thereafter upsetting the protruding end in said cavity when said slide reaches its forwardmost position, and knockout means on said slide expanding said die elements and removing an upset blank therefrom while said blank remains in said solid die in response to movement of said slide away from said solid die.

3. In a machine of the character described a frame, a holding die, a slide reciprocable in said frame forward and rearward relative to said holding die, means positioning an elongated blank in said holding die with one end protruding therefrom, a tool assembly on said slide including opening die elements proportioned when closed to fit around the protruding end, a die element carrier positioning said elements in their closed position around said protruding part after a blank is in said holding die and as said slide approaches said holding die, an upset tool movable relative to said carrier upsetting said one end as said slide reaches its forwardmost position, and means preventing movement of said blank rearward with said slide and opening said die elements and ejecting said blank therefrom while said blank remains in said holding die in response to rearward movement of said slide.

4. In a machine of the character described for upsetting blanks with shanks, a frame, a breast on said frame, a slide movable toward and away from said breast, a solid die on said breast proportioned to receive the shank of a blank, an assembly carried by said slide including a plurality of die segments movable between closed and opened positions, said segments cooperating when closed to define a die cavity having a throat portion and an enlarged cross-section portion on the side of said throat remote from said breast, resilient means urging said die segments toward said closed position, means positioning said segments in said closed position around a portion of a blank held in the die in said breast in response to movement of said slide toward said breast, and an upsetting tool on said slide operable to engage and upset a blank within said die cavity as said slide approaches said breast.

5. A machine for upsetting blanks comprising a frame, a breast on said frame, a slide movable toward and away from said breast, a blank receiving die carried by said breast, a tool assembly on said slide, said assembly including a plurality of die segments movable between closed and opened positions, said segments cooperating when closed to define a die cavity having a throat portion and an enlarged cross-section portion on the side of said throats remote from said breast, first means positioning said segments in said closed position around a portion of a blank previously positioned in the die in said breast as the slide approaches said breast, an upsetting tool on said slide operable to engage and upset a blank within said die cavity as said slide approaches said breast, and second means ejecting said blank from said segments as said slide moves away from said breast causing said segments to separate and pass over the upset portion of said blank while said blank remains supported in said blank supporting die.

6. A progressive header comprising a frame, a die breast, a slide movable forward and rearward relative to said die breast, cooperating tools and dies on said die breast and slide operable to progressively extrude a shank on a blank, upset a first portion intermediate the ends of said blank and separate tools and dies on said slide and breast including a solid die receiving said shank, a plurality of expandable die elements, means to position said elements around said first portion to confine said first portion after said shank is in said solid die and thereafter upset a second portion within said die elements, and means operable to remove the upset blank from said die elements causing said die elements to expand during the removal of the upset blank therefrom while said shank is supported in said solid die.

7. In a machine of the character described a frame, a solid die on said frame proportioned to position a blank with a portion protruding therefrom, a slide reciprocable in said frame toward and away from said solid die, a tool assembly carried by said slide including a carrier, a plurality of die segments cooperating when closed to define a die cavity, inter-engaging guide surfaces on said carrier and die segments operable to move said die segments to their closed operative position in response to movement of said carrier relative to said die segments in a direction toward said solid die and operable to move said die segments to open in response to movement of said carrier relative to said segments in a direction away from said solid die, an upsetting tool on said slide, movement of said slide toward said solid die positioning said segments against said solid die in said closed position around said protruding portion and pressing said upsetting tool against the blank upsetting it into said die cavity, knockout means on said slide operable to prevent movement of the upset blank with said slide in a direction away from said solid die while said blank remains supported by said solid die, inter-engagement between said die segments and said blank operating to move said die segments relative to said carrier to an open position when said knockout means operates permitting removal of the upset blank from said die segment.

8. In a machine of the character described a frame, a solid die on said frame proportioned to position a blank with a portion protruding therefrom, a slide reciprocable in said frame toward and away from said solid die, a tool assembly carried by said slide including a carrier, a plurality of die segments cooperating when closed to define a die cavity, inter-engaging camming surfaces on said carrier and die segments operable to move said die segments to their closed operative position in response to movement of said carrier relative to said die segments in a direction toward said solid die and operable to allow said die segments to open in response to movement of said carrier relative to said segments in a direction away from said solid die, spring means between said segments and carrier urging them toward said closed position, an upsetting tool on said slide, movement of said slide toward said solid die positioning said segments in said closed position around said protruding portion and thereafter pressing said upsetting tool against the blank upsetting it into said die cavity, knockout means operable to prevent movement of the upset blank with said slide in a direction away from said solid die while said blank remains supported by said solid die, inter-engagement between said die segments and said blank operating to move said die segments against the action of said spring means relative to said carrier to an open position when said knockout means operates permitting removal of the upset blank from said die segment.

9. An apparatus for upsetting a second portion on a blank having a shank and a first upset portion comprising a frame assembly, a slide assembly reciprocable in said frame assembly, a solid die on one of said assemblies adapted to receive the shank of the blank, a plurality of die segments on the other of said assemblies radially movable between opened and closed positions, means closing said segments around a blank already positioned in said solid die in said closed position, said die segments cooperating when closed to closely confine said first upset portion and define a die cavity for a second upset portion, upsetting means engaging and upsetting a second upset portion in said die cavity, and blank removal means operable to eject said blank from said die segments while said blank remains supported in said solid die causing opening of said die segments during such ejection.

10. An apparatus for upsetting a second portion on a blank having a shank and a first upset portion intermediate the ends of said blank comprising a frame assembly, a slide assembly reciprocable in said frame assembly, a solid die on one of said assemblies adapted to receive the shank of the blank, a plurality of die segments on the other of said assemblies radially movable between opened and closed positions, means closing said segments around a blank in said solid die after said blank is supported by said solid die, said die segments cooperating when closed to closely confine said first upset portion and define a die cavity for a second upset portion, upsetting means engaging and upsetting said second upset portion in said die cavity, and blank removal means operable to eject said blank from said die segments while said blank remains supported by said solid die causing said die segments to open clear of said blank during such ejection.

11. A process of forming a metal article from cylindrical stock comprising the steps of pressing a portion of stock through an extrusion throat forming an extruded portion of reduced diameter, thereafter confining the blank on both sides of a first section of the unextruded portion thereof and upsetting said first section to an increased diameter intermediate the ends of said stock, and thereafter laterally confining unextruded stock between said upset first section and a spaced second section of unextruded stock and upsetting said second section to an increased diameter at a point spaced from said first section by a section having a diameter less than said upset sections.

References Cited by the Examiner

UNITED STATES PATENTS

| | | |
|---|---|---|
| 2,030,290 | 2/36 | Friedman. |
| 2,169,894 | 8/39 | Criley _____ 29—552.4 X |
| 2,210,107 | 8/40 | Thomas et al. _____ 10—27 |
| 2,287,214 | 6/42 | Wilcox _____ 10—27 X |
| 2,581,774 | 1/52 | Stone et al. _____ 29—552.4 X |
| 2,743,509 | 5/56 | Friedman _____ 29—552.4 X |

FOREIGN PATENTS 717,630  1/32  France.

WHITMORE A. WILTZ, *Primary Examiner.*

HYLAND BIZOT, *Examiner.*